United States Patent [19]
Keijzer et al.

[11] 3,817,566
[45] June 18, 1974

[54] ENERGY ABSORBER

[75] Inventors: Johan H. Keijzer, Hasselt; Willy R. J. Pierle, Tienen; G. Van de Voordf, Sint-Martent-Latem, all of Belgium

[73] Assignee: Monroe Belgium N.V., Sint-Truiden, Belgium

[22] Filed: Mar. 13, 1972

[21] Appl. No.: 234,085

[52] U.S. Cl............... 293/70, 267/64 R, 188/314
[51] Int. Cl............................................. B60r 19/06
[58] Field of Search ............ 293/DIG. 2, 60, 70, 85, 293/86, 89; 267/64 R; 188/297, 314

[56] References Cited
UNITED STATES PATENTS

| | | | |
|---|---|---|---|
| 1,702,675 | 2/1929 | Ventura | 293/DIG. 2 |
| 2,379,388 | 6/1945 | Thornhill | 267/64 R |
| 2,618,478 | 11/1952 | Conway | 293/DIG. 2 |
| 3,008,746 | 11/1961 | Senger | 293/DIG. 2 |
| 3,380,247 | 4/1968 | Colmerauer | 267/64 R |
| 3,592,302 | 7/1971 | Allinquant | 188/314 |

FOREIGN PATENTS OR APPLICATIONS
1,122,780  1/1962  Germany.......................... 267/64 R Primary Examiner—Lloyd L. King
Assistant Examiner—Robert Saifer
Attorney, Agent, or Firm—Harness, Dickey & Pierce

[57] ABSTRACT

An energy absorber for vehicle bumpers and the like comprising a pair of telescopic tubular housings, attachment means for securing one of the housings to the vehicle frame and the other of the housings to the vehicle bumper, a piston located in one of the housings movable longitudinal thereof in response to a preselected impact force being applied to the energy absorber, a pressurizable chamber located in one of the housing members and valve means interposed between the chamber and the piston for selectively controlling the flow of fluid from one side of said of the assembly to the other side thereof to effect pressurization and de-pressurization of the chamber in response to the application and relief of the impact force.

11 Claims, 10 Drawing Figures

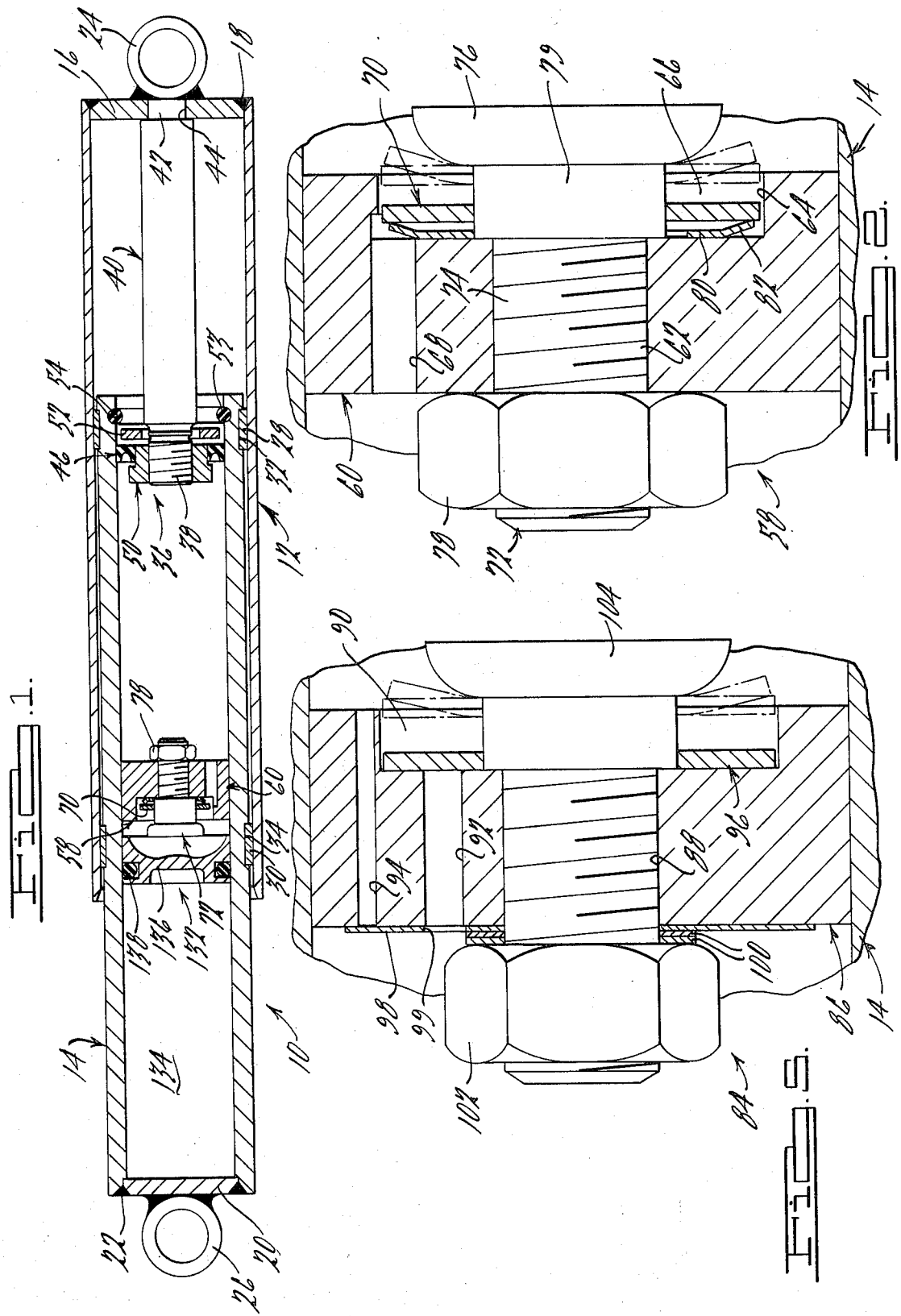

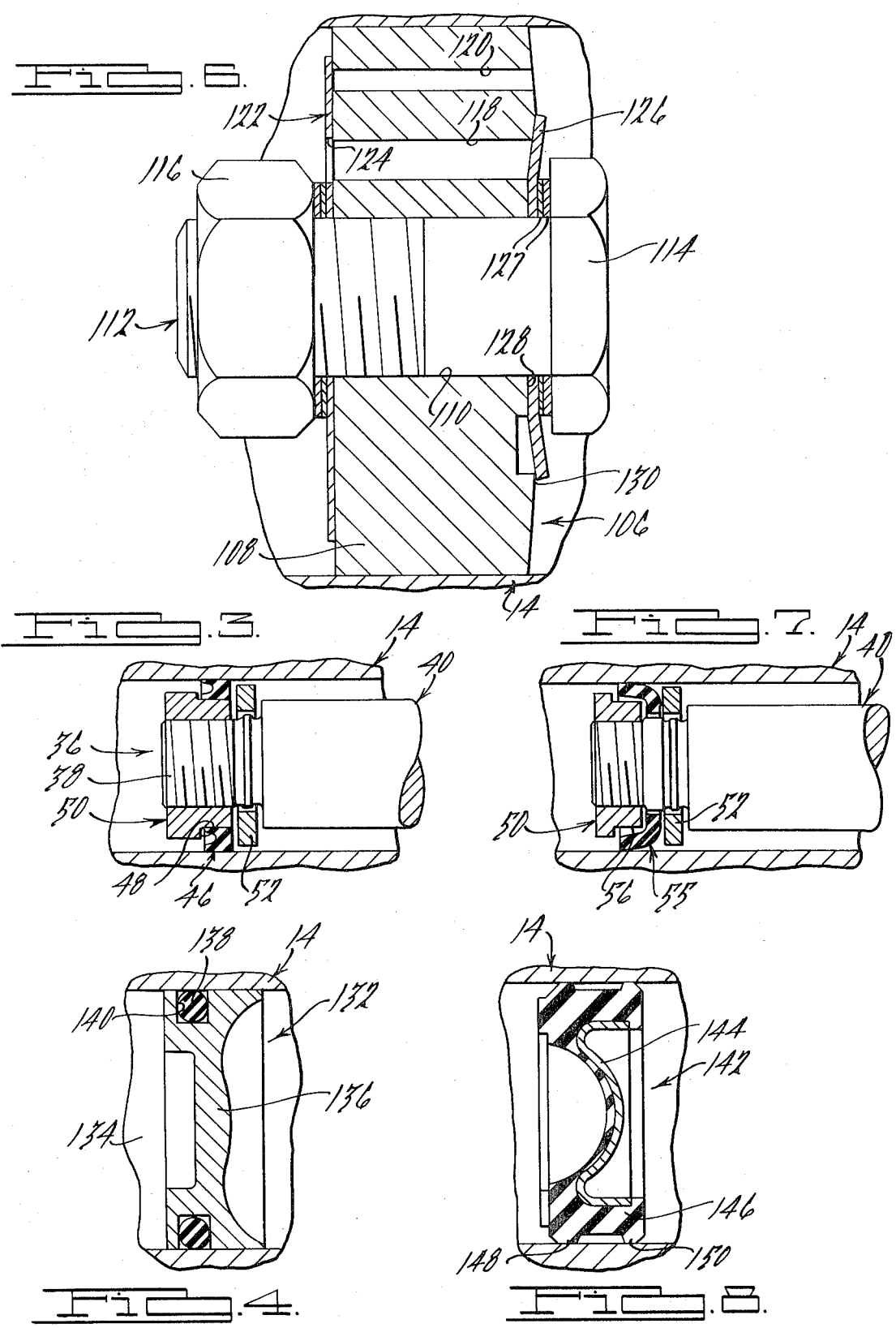

3,817,566

ENERGY ABSORBER

BACKGROUND OF THE INVENTION

It is well known that front and rear end of vehicular impact at a speed of as low as 5 miles per hour will cause substantial vehicle damage. In order to mitigate the financial burden upon the public, legislation has been passed requiring that all automotive vehicles be able to withstand at least a 5 mile per hour impact without incurring any appreciable damage. In order to come within the regulations of such legislation, automobile manufacturers are contemplating the use of high impact energy absorbers at at least the front end, and eventually at both the front and rear ends, of vehicles to be manufactured in the future.

While there has been a wide variety of different types of energy absorbers known in the prior art which have been capable, at least to some degree, of absorbing the high impact energy created in a vehicle collision, most, if not all, of such prior known devices have been incapable of satisfying the strict design criteria that have been established. For example, due to certain design compromises in modern automotive vehicles, there is a maximum impact force which a vehicle can withstand without component failure occurring. This could be the shearing of bumper bolt, engine mount, or the like. The automotive industry has indicated that a maximum allowable force that can be transmitted to a basic frame or chassis structure is in the range of 10,000 to 12,000 pounds. The energy to stop a 4,000 pound mass (weight of a typical automotive vehicle) moving at a velocity of 5 miles per hour, or 7.33 feet per second, is in the order of 40,000 inch pounds, and where 10,000 pounds is the maximum allowable force or load which can be incurred by the vehicle per energy absorbing unit, and where two units are used, a square force displacement curve is required having a 2 inch stroke. As previously mentioned, prior known energy absorbing devices which would be economically feasible on modern mass produced automotive vehicles have been incapable of absorbing or dissipating a 10,000 pound force a 4 inch stroke and as such, fall short of satisfying the established operational requirements.

SUMMARY OF THE INVENTION

The present invention relates to an energy absorber unit which is intended to exhibit considerably superior operating characteristics, as compared with the various analogous devices known in the prior art; more importantly, however, the energy absorber of the present invention will be found to satisfy the established design criteria for modern automotive vehicles. Generally speaking, the energy absorber of the present invention comprises a pair of concentrically oriented, telescopic tubular housings. A piston is disposed in one end of one of the housings and is fixedly secured via a piston rod to the other of the housings. The first mentioned housing comprises a gas chamber and a valve assembly is interposed between the piston and the gas chamber and is adapted to control the flow of fluid between the opposite sides of the assembly, with fluid flowing toward the chamber causing compression and hence pressurization of the gas therein. More particularly, upon impact, the two housings are intended to telescope, whereby fluid is forced through the valve assembly to effect dissipation or damping of the impact force, with the result that the vehicle will begin to decelerate. As the vehicle velocity decreases, however, so does the hydraulic force, and accordingly, the valve assembly is designed such that the damping force increases concomitantly with a decrease in the hydraulic force, whereby to obtain a relatively square force curve. As will hereinafter be described in detail, the compressed gas serves to bias a floating piston back toward the valve assembly and hence the fluid which is displaced through the assembly will be moved back therethrough to effect extension of the unit so that the same will return to its original configuration.

It is accordingly a general object of the present invention to provide a new and improved energy absorber for use in operative association with the automotive vehicle bumpers and the like.

It is a more particular object of the present invention to provide a new and improved energy absorber which utilizes both hydraulics and a gas pressure spring.

It is yet a more particular object of the present invention to provide a new and improved energy absorber which utilizes a relatively fixed valve assembly through which fluid flow is controlled to effect damping or dissipation of impact energy.

It is another object of the present invention to provide an energy absorber which is of a strong, durable construction and is capable of absorbing high impact energy with a minimum stroke.

It is another object of the present invention to provide an energy absorber which may be subjected to substantial bending forces, as might occur when the associated vehicle is "jacked-up" by an associated bumper.

It is another object of the present invention to provide a new and improved energy absorber of the above described type which includes means for preventing extension thereof beyond a predetermined amount so that the associated vehicle may be towed by its bumper.

It is still a further object of the present invention to provide an energy absorber which is of a simple design, is economical to manufacture and easy to install.

Other objects and advantages of the present invention will become apparent from the following detailed description, taken in conjunction with the accompanying drawings.

BRIEF DESCRIPTION OF THE DRAWINGS

FIG. 1 is a longitudinal cross-sectional view of an energy absorber in accordance with the principles of the present invention;

FIG. 2 is an enlarged cross-sectional view of the valve assembly incorporated in the energy absorber illustrated in FIG. 1;

FIG. 3 is an enlarged cross-sectional view of the piston incorporated in the energy absorber illustrated in FIG. 1;

FIG. 4 is an enlarged cross-sectional view of the floating piston member incorporated in the energy absorber shown in FIG. 1;

FIG. 5 is an enlarged cross-sectional view of a modified embodiment of the valve assembly incorporated in the present invention;

FIG. 6 is an enlarged cross-sectional view of yet another embodiment of a valve assembly adapted for use in the present invention;

FIG. 7 is an enlarged cross-sectional view of an alternate embodiment of the piston incorporated in the energy absorber of the present invention;

FIG. 8 is an enlarged cross-sectional view of an alternate embodiment of the floating piston incorporated in the energy absorber of the present invention;

DESCRIPTION OF THE PREFERRED EMBODIMENTS

Figure 9:
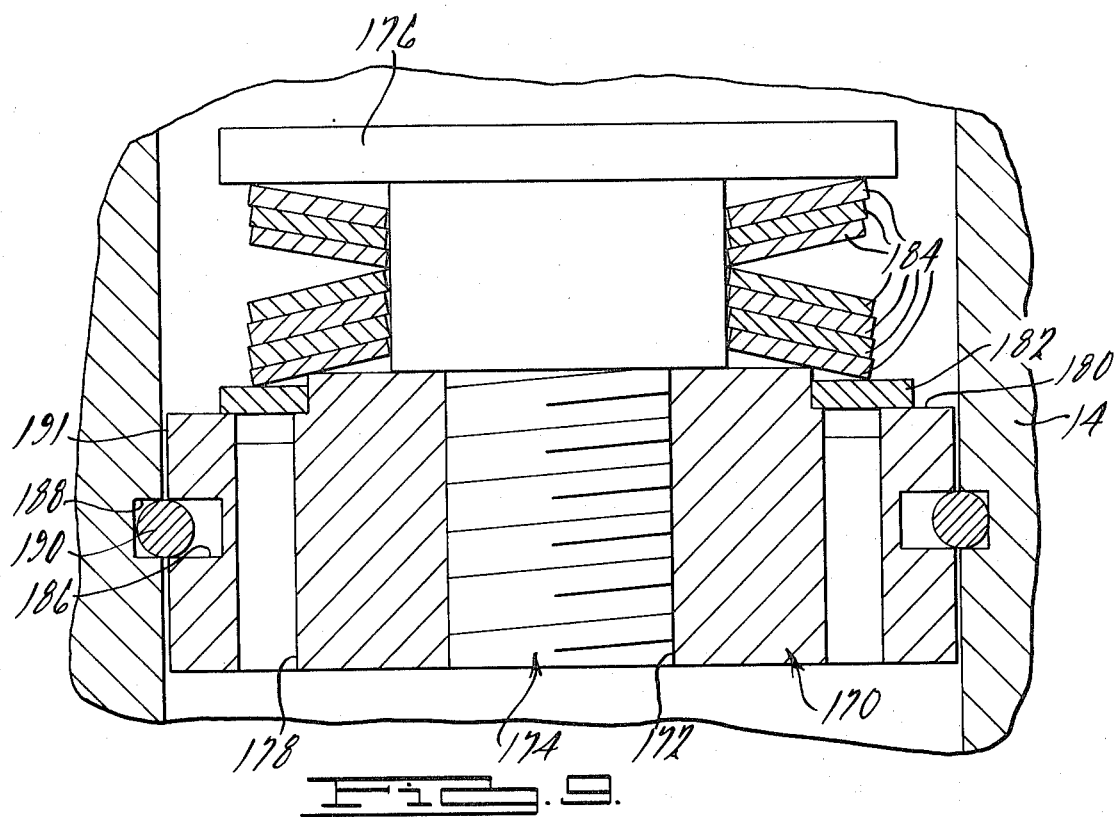
FIG. 9 is an enlarged cross-sectional view of still another modified embodiment of the valve assembly incorporated in the present invention.

Referring now in detail to the drawings and in particular to FIG. 1 thereof, an energy absorber unit 10, in accordance with one preferred embodiment of the present invention, is shown generally as comprising a pair of tubular or cylindrical housing members 12 and 14, the latter of which is slightly smaller in diameter than the member 12 and is adapted for telescopic movement interiorly thereof. The axially opposite or outer end of the housing member 12 is closed by an end header member 16 which may be and preferably is secured to the member 12 as by welding or the like, as designated by the numeral 18. In a similar manner, the outer end of the housing member 14 is closed by an end header member 20 that is secured thereto as by welding or the like 22. The housing members 12 and 14 are provided with attachment means in the form of attachment rings or the like 24, 26 which are fixedly secured as by welding or the like to the header members 16, 20, respectively, whereby the outer end of the housing member 14 is adapted for attachment to a vehicle bumper or the like (not shown) and the housing member 12 is adapted for attachment to a suitable portion of a vehicle frame (not shown). A pair of longitudinally spaced sleeve bushings 28 and 30 are provided interjacent the inner periphery of the housing member 12 and the outer periphery of the housing member 14, the bushings 28, 30 being carried within suitable radially inwardly disposed annular recesses 32 and 34, respectively, whereby to provide for relative longitudinal sliding or telescopic movement between the housing members 12, 14 under the influence of an impact force applied to the unit 10, as will hereinafter be described in detail.

Generally speaking, two of the units 10 are adapted to function in operatively supporting an associated bumper upon the frame of a vehicle, whereby the units 10 will function to absorb the impact energy created upon engagement of the bumper with an object at relatively low vehicle speeds, i.e., in the order of zero to 10 miles per hour, thus preventing the impact energy from being transmitted to the vehicle frame so as to minimize damage to the vehicle. It will be appreciated, of course, that the units may be located at either the front or rear of the associated vehicle and may function in absorbing impact energy of both front and rear end collisions. It will be noted that while the above described attachment rings 24, 26 are intended to be a highly satisfactory and preferable way of installing the unit 10 on an automotive vehicle, various alternative means may be utilized in operatively mounting the unit 10 without departing from the scope or fair meaning of the present invention. It may also be noted that the provision of the sleeve bushings 28, 30 which are spaced apart a substantial axial distance, enable the unit 10 to withstand substantial bending loads, such as might occur when the associated vehicle is being "jacked-up," by its associated bumper.

With reference now to FIGS. 1 and 3, disposed interiorly of the inner end of the housing member 14 is a piston assembly, generally designated by the numeral 36. The assembly 36 is mounted on a reduced diameter exteriorly threaded end portion 38 of an axially disposed piston rod 40 which extends between the end header member 16 and the inner end of the housing member 14. The outer end of the piston rod 40 is formed with a reduced diameter end portion 42 adapted to be received and fixedly secured within a central bore 44 formed in the end header member 16. The piston assembly 36 comprises a generally cup-shaped annular fluid seal or packing 46 which is disposed between an annular shoulder 48 of a seal retaining member 50 threadably received on the end portion 38 of the piston rod 40, and an annular ring 52. The ring 52 is also carried on the end portion 38 of the piston rod 40 and is cooperable with an annular stop ring 53 which is supported within an annular groove 54 formed around the inner periphery of the housing member 14 directly adjacent the inner end thereof. The stop ring 53 and ring 52 are cooperable to prevent undesirable extension or expansion of the unit 10 at such time as the unit is placed under a condition of tension, such as might occur when the associated vehicle is being towed by its bumper. The seal 46 is adapted for sealing engagement with the inner periphery of the housing member 14 so that upon longitudinal collapsing of the unit 10, fluid which is normally disposed within the housing 14 will be forced toward the outer end thereof, as will be described in detail.

It will be appreciated, of course, that the piston assembly 36 may be of various constructions other than that known in FIGS. 1 and 3 herein. For example, instead of the seal 46, the assembly could be provided with a cup packing 55 as is shown in FIG. 7, which functions to sealingly engage the inner periphery of the housing member 14 in much the same manner as the aforedescribed seal 46. It will be noted that various alternative sealing constructions could be used, such as O-rings and the like, as will be appreciated by those skilled in the art.

Disposed interiorly of the housing member 14 approximately equidistance from the opposite ends thereof is a valve assembly, generally designated by the numeral 58. The assembly 58 comprises a valve plate 60 which is fixedly secured within the housing member 14 and extends entirely across the interior thereof. The plate 60 is formed with a longitudinally extending central bore 62, with the interior end of the bore 62 being formed with an enlarged diameter counterbore 64 defining a valve chamber 66. The valve plate 60 is also formed with a plurality of circumferentially spaced, axially extending valve ports 68 which function to communicate fluid between the chamber 66 and the outer side of the valve plate 60, as best seen in FIG. 2. The plurality of valve ports are adapted to be selectively opened and closed by means of an annular valve disc 70 which is disposed within the chamber 66 and supported therein for relative longitudinal movement by means of an axially extending valve support stud 72. As illustrated, the stud 72 comprises a threaded end portion 74 which extends through the bore 62. One end of the stud 72 is formed with an enlarged diameter head portion 76 with the opposite end thereof adapted to threadably receive a suitable nut 78, as illustrated. The stud 72 is formed with a shoulder 79 along which the valve disc 70 is longitudinally slidable. Disposed interjacent the valve disc 70 and the inner end of the counterbore 64 is a valve spring disc 80 which is of a generally star-shaped configuration and is formed with an offset peripheral portion 82 adapted to bear against the inner side of the valve disc 70. Generally speaking, in operation of the valve assembly 58, at such time as an impact force is exerted upon the unit 10, causing telescoping collapsing movement of the housing members 12 and 14, the piston assembly 36 will force fluid through the plurality of valve ports 68, whereby the valve disc 70 will move axially along a shoulder 79 of the stud 72 to a position where the disc 70 engages the underside of the valve stud head portion 76. In this position, fluid is restricted from flowing between the outer periphery of the valve disc 70 and the periphery of the chamber 66 thus causing resistance to collapse of the unit 10. At such time as the pressure of the fluid within the housing 14 increases to some predetermined level, the valve disc 70 will bend or deform, as shown by the phantom lines in FIG. 2, whereby the fluid will be free to pass between the disc 70 and the end of the valve plate 60. At the termination of the impact force, the fluid which has been displaced through the valve assembly 58 will thereafter be forced back through the same into the inner end of the housing 14 in a manner hereinafter to be described. The fluid flowing back through the assembly 58, i.e., from left to right in FIG. 2, will cause the valve disc 70 to move back toward the solid line position in this figure and the pressure of the fluid will cause the peripheral portion 82 of the spring 80 to deform so that the element 80 assumes a generally planar configuration, whereby the fluid can flow through an annular bleed orifice defined between the outer periphery of the disc 70 and the inner periphery of the chamber 66, preparatory to the next impact stroke. It will be appreciated by those skilled in th art that the valve assembly 58 may be of various constructions provided that the desired "hold-off" of fluid passing therethrough is achieved so that a substantially square force wave will be obtained during operation f the unit 10. FIG. 5 illustrates a typical modified embodiment of the aforedescribed valve assembly wherein an assembly 84 is shown as comprising a valve plate 86 that is analogous to the valve plate 60, hereinbefore described. The plate 86 is formed with a central bore 88, one end of which defines an enlarged diameter valve chamber 90. A plurality of circumferentially spaced, axially extending valve ports 92 are formed in the valve plate 86 and communicate on the chamber 90 with the opposite side of the plate 86. A second plurality of circumferentially spaced axially extending valve ports 94 are arranged radially outwardly from the valve ports 92 and communicate the opposite sides of the valve plate 86, as illustrated. Disposed within the chamber 90 is an annular valve disc 96 which, in the solid line position shown in FIG. 5, functions to close the inner ends of the valve ports 92. Another valve disc 98 is disposed on the outer side of the valve plate 86 and functions to close the outer ends of the plurality of valve ports 94. It will be noted that the valve disc 98 is formed with a plurality of apertures 99 which are in registry with the ports 92 to provide for fluid communication therethrough. A plurality of spacer elements or the like 100 are provided on the outer side of the valve disc 98 and cooperate with a nut 102 mounted on one end of a valve stud 104 in assuring the proper operational characteristics of the disc 98. As such time as an impact force is applied to the associated energy absorbing unit, the valve disc 96 operates in the same manner as the aforedescribed disc 70 of the assembly 58 in controlling fluid flow from one side of the assembly 84 to the opposite side thereof. At the termination of the impact force, the fluid which has previously been displaced through the valve ports 92 will flow back through the plurality of ports 94, wherein the valve disc 98 will lift off the adjacent side of the valve plate 86 to permit the fluid to flow into the inner end of the associated housing member 14.

Another typical modified embodiment of the valve assembly 58 is shown in FIG. 6 wherein a valve assembly 106 is shown as comprising a valve plate 108 defining a central bore 110 through which a longitudinally extending valve stud 112 extends. The stud 112 includes a head portion 114 at one end thereof and has a the 116 threadably mounted on the opposite end thereof. A plurality of axially extending, circumferentially spaced valve ports 118 are formed in the valve plate 108, and in addition, a second plurality of circumferentially spaced, axially extending of ports 120 are provided in the valve plate 108 radially outwardly from the valve ports 118. An annular valve disc 122 is disposed adjacent the side of the valve plate 108 confronting the nut 116, which valve disc 122 is adapted to move toward and away from a position closing or blocking fluid flow through the valve ports 120. As illustrated, the valve disc 122 is formed with a plurality of apertures 124 that are in alignment with the valve ports 118 to provide fluid flow therethrough. A second valve disc 126 is disposed along the side of the valve plate 108 adjacent the head portion 114 of the stud 112. The valve disc 126 is normally maintained in a position blocking fluid flow through the valve ports 118 by means of the stud 112 and a plurality of spacer members 127 located adjacent the underside of the head portion 114. As illustrated, the valve disc 126 is adapted to be preloaded so as to remain in a closed position until such time as the pressure of the fluid flowing through the valve port 118 reaches a predetermined value. Such preloading is achieved by providing axially spaced surfaces 128 and 130 at the radially inner and outer edges of the valve member 126. As will be appreciated by those skilled in the art, the valve assembly 106 is intended to operate in virtually the same manner as the aforedescribed valve assembly 84 in controlling fluid flow between the opposite sides of the assembly 106 during an impact cycle on the associated energy absorber unit. Accordingly, a detailed dscription of the operation of the assembly 106 will be omitted for purposes of conciseness of description.

With reference now to FIGS. 1 and 4, disposed interiorly of the housing member 14 directly outwardly from the valve assembly 60 is a spring means including a longitudinally movable floating piston 132. The piston 132 extends entirely across the interior of the housing member 14 and separates a gas chamber 134 from the fluid which is located within the interior end of the member 14. The gas which is contained within the chamber 134 may be of any suitable compressible inert type, such as nitrogen. As shown in FIG. 4, the piston 132 comprises a generally cup-shaped piston body 136 which is provided with an O-ring type seal or the like 138 that extends around the outer periphery thereof and is nestingly received in a suitable annular groove or recess 140, the seal 138 acting to provide a fluid tight seal between the outer periphery of the piston body 136 and the inner periphery of the housing member 14. As will be appreciated by those skilled in the art, the floating piston 132 may be of various constructions such as, for example, the construction shown in FIG. 8 wherein a floating piston 142 is shown as comprising a generally cup-shaped frame member 144 which is adapted to be embedded within or coated with a resilient elastomeric material, such as rubber or the like, generally designated by the numeral 146. The material 146 is formed so as to comprise a pair of axially spaced, circumferentially extending seal portions 148, 150 adapted for sealing engagement with the inner periphery of the associated housing member 14 in much the same manner as the aforementioned O-ring seal 138. Generally speaking, the floating piston 132 is intended to cooperate with the gas within the chamber 134 in providing a spring means for forcing fluid which has passed through the valve assembly 60 during an impact cycle, back through the assembly 60 into the interior end of the housing member 14 so as to effect expansion of the unit 10 so that the same will resume its normal extended position at the termination of a collision, as will hereinafter be described in connection with the overall operation of the unit 10 of the present invention.

Figure 10:
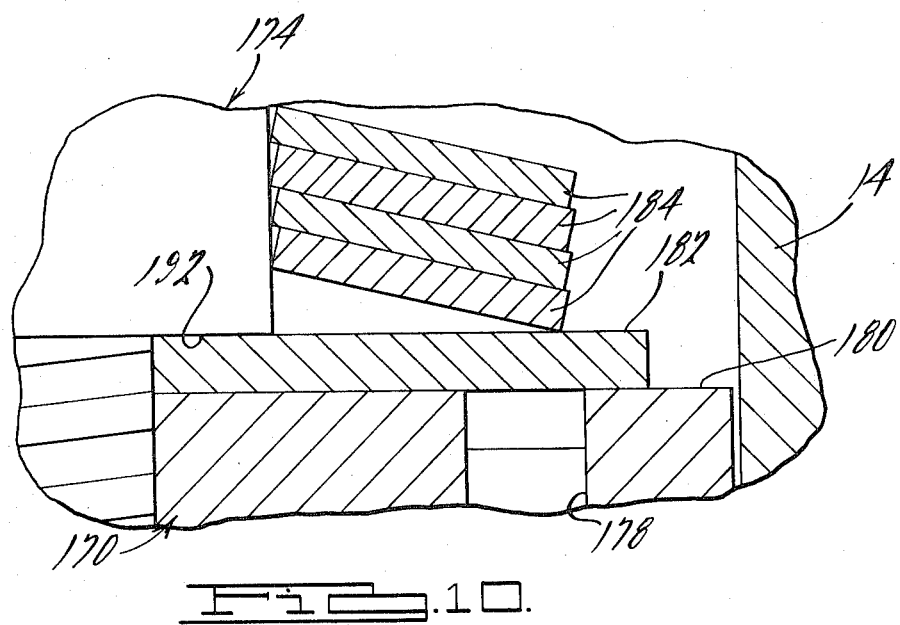
FIG. 10 is an enlarged cross-sectional view of a modification of the valve assembly shown in FIG. 9.

FIG. 9 illustrates still another embodiment of a valve assembly which is adapted for incorporation in the energy absorbers in the present invention. The subject valve assembly includes a valve plate 170 formed with a central internally threaded bore 172 adapted to threadably receive a valve stud 174 having an enlarged diameter head section 176. The valve plate 170 is formed with a plurality of longitudinally extending circumferentially spaced valve ports 178 and defines an annular valve seat 180. A valve disk 182 extends around the valve stud 176 and is adapted for engagement with the seat 180 to block fluid flow through ports 178, with the valve disk 182 being urged into engagement with the valve seat 180 by means of a plurality of Belleville type spring washers 184. As will be appreciated, the valve disk 182 will move toward an open position against the resistance of the washers 184 in response to a pre-selected fluid pressure in the ports 178. The valve plate 170 is retained within the member 14 at a position wherein aligned annular recesses 186 and 188 on the plate 170 and member 14 are aligned and adapted to contain a common circlip 190 or an equivalent thereof. An annular space is provided between the outer periphery of the valve plate 170 and the inner periphery of the member 14 to provide for a fluid bleed to return fluid after an energy absorbing cycle. FIG. 10 illustrates another valve assembly which is much the same as the assembly shown in FIG. 9 with the exception that the valve disk 182 is retained between the valve plate 170 and an annular shoulder 192 defined on the underside of the valve stud 174, whereby the inner periphery of valve disk 182 is prevented from moving axially while the outer periphery thereof may deform against the resistance of the washers 184 to permit fluid flow through the ports 178.

Referring now to the overall operation of the unit 10 of the present invention, said unit normally will assume the configuration shown in FIG. 1, whereby to operatively support the associated vehicle bumper at a position spaced some predetermined distance from the associated vehicle frame. At such time as either the vehicle frame or the vehicle bumper undergoes an impact force, the housing members 12 and 14 will telescopically collapse. When this occurs, the piston assembly 36 will force the fluid which is provided within the interior end of the housing member 14 through the valve assembly 60, which fluid will thereby cause the floating piston 132 to be moved toward the outer end of the housing member 14, resulting in the gas which is disposed within the chamber 134 being compressed some predetermined amount. The restriction to fluid flow through the valve assembly 60 and the force required to effect compression of the gas within the chamber 134 will absorb the impact energy so as to prevent such energy from subjecting the associated vehicle frame to any structural damage, within predetermined limits. At such time as the impact force is relieved, i.e., at the end of a collision, the compressed gas within the chamber 134 will cause the piston 132 to move toward the valve assembly 60, whereby the fluid that was displaced through the assembly 60 during collapse of the unit 10 will be forced back through the valve assembly 60 toward the inner end of the housing member 14. As this occurs, the fluid will act upon the piston assembly 36 to effect expansion of the entire unit 10, whereby the unit will again resume the position shown in FIG. 1, thus automatically repositioning the vehicle bumper at the aforementioned predetermined position relative to the vehicle frame.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. An energy absorber unit for a vehicle bumper adapted for limited longitudinal movement between an extended and retracted position relative to the vehicle frame, said unit comprising first and second relatively thin-walled hollow cylindrical members, the outer diameter of said hollow housing members being substantially equal but slightly smaller than the inner diameter of said first hollow housing members, whereby one axial end of said second housing member may be longitudinally received within one end of said first housing member and be telescopically movable relative thereto, said first and second hollow cylindrical housing members when telescopically oriented relative to one another defining an elongated chamber, one part of which is within said first housing member and the remaining portion of which is within said second housing member, a first attachment element fixedly mounted to the outer end of one of said members for securing the same to the vehicle frame, and a second attachment element fixedly mounted to the outer end of the other of said members for securing the same to the vehicle bumper, a quantity of hydraulic fluid in said second housing member, a spring assembly within said second housing member operable to cause telescopic extension of said housing members, said spring assembly including a quantity of gas and a floating piston member longitudinally slidably disposed within one of said housing members and adapted to separate said fluid from said gas, a valve assembly supported in said second housing members between said spring assembly and said quantity of hydraulic fluid, said valve assembly including a valve plate extending transversely across the associated of said housing members and formed with at least one longitudinally extending flow port through which fluid may pass from one side of said valve plate to the opposite side thereof, a valve element secured to one side of said valve plate and being movable between a first position substantially blocking fluid flow through said flow port, a second position providing for restricted bleed of fluid through said flow port and a third position providing for a substantially unrestricted fluid flow through said flow port, interengageable means secured to said first and second housing members and located remote from and being completely independent of said spring and valve assemblies for limiting telescopically opposed movement of said housing members, said housing members being telescopically collapsible in response to an impact force being applied to the unit, whereby hydraulic fluid within said second housing member will be displaced through said valve assembly to effect compression of said spring assembly, with said spring assembly being operable upon cessation of said impact force to cause said displaced fluid to flow back through said valve assembly to effect expansion of said housing members to a preselected extended orientation.

2. The invention as set forth in claim 1 wherein said floating piston comprises a relatively rigid piston member extending substantially across said other housing member, and which includes sealing means extending around the outer periphery of said piston member and adapted for sealing engagement with the inner periphery of the associated of said housing members.

3. The invention as set forth in claim 1 wherein said floating piston comprises a relatively rigid frame member embedded within a resilient deformable outer layer, the outer periphery of which is adapted for sealing engagement with the inner periphery of the associated of said housing members.

4. The invention as set forth in claim 1 which includes a piston fixedly secured to one end of a piston rod which is in turn connected to said first housing member, and which includes a cup-shaped seal extending around the outer periphery of said piston and adapted for sealing engagement with the inner periphery of said second housing member.

5. The invention as set forth in claim 4 wherein said piston comprises a U-shaped packing extending around the outer periphery thereof and adapted for sealing engagement with the inner periphery of said associated housing member to said second compartment.

6. The invention as set forth in claim 1 wherein said valve plate comprises first flow passage means and second flow passage means, which includes a first valve element for opening and closing said first flow passage means and a second valve element for opening and closing said second flow passage means.

7. The invention as set forth in claim 6 which includes a first plurality of circumferentially spaced flow passages extending axially through said valve plate, a first valve element at one end of said valve plate for selectively controlling fluid flow through said first plurality of flow passages, a second plurality of circumferentially spaced flow passages extending through said valve plate, and a second valve element at the opposite end of said valve plate from said first element for controlling fluid flow through said second plurality of flow passages.

8. The invention as set forth in claim 7 wherein at least one of said valve elements is preloaded to move from a closed position to an open position in response to a predetermined pressure.

9. An energy absorber unit for a vehicle bumper adapted to permit limited longitudinal movement of the bumper from an extended position to a retracted position relative to a vehicle frame in response to the application of an impact force, said unit comprising first and second relatively thin-walled hollow cylindrical members, the outer diameter of said hollow housing members being substantially equal but slightly smaller than the inner diameter of said first hollow housing members, whereby one axial end of said second housing member may be longitudinally received within one end of said first housing member and be telescopically movable relative thereto, said first and second hollow cylindrical housing members when telescopically oriented relative to one another defining an elongated chamber, one part of which is within said first housing member and the remaining portion of which is within said second housing member, first attachment means mounted on the axially outer end of one of said members for securing the same to the vehicle frame and second attachment means mounted on the axially outer end of the other of said members for securing the same to the vehicle bumper, a quantity of hydraulic fluid in said second housing member, a piston in said second housing member and connected to said first housing member and having an end thereof exposed to said fluid and movable longitudinally within said second housing member concomitantly with telescopic movement of said first housing in response to said impact force being applied to the unit, a spring assembly within one of said housing members operable to cause telescopic extension of said housing members, said spring assembly including a quantity of gas and a floating piston member longitudinally slidably disposed within one of said housing members and adapted to separate said fluid from said gas, a valve assembly interposed between said spring assembly and said piston, interengageable means secured to said first and second housing members and located remote from and being completely independent of said spring and valve assemblies for limiting telescopically opposed movement of said housing members, said valve assembly including means extending transversely across the associated of said housing members and formed with at least one longitudinally extending flow port through which fluid may pass from one side of said means to the opposite side thereof, and a valve element secured to one side of said last-mentioned means and being movable between a first position substantially blocking fluid flow through said flow port, a second position providing for restricted bleed of fluid through said flow port and a third position providing for a substantially unrestricted fluid flow through said flow port.

10. The invention as set forth in claim 9 wherein said valve plate comprises first flow passage means and second flow passage means, which includes a first valve element for opening and closing said first flow passage means and a second valve element for opening and closing said second flow passage means.

11. The invention as set forth in claim 10 which includes a first plurality of flow passages extending through said valve plate, a first valve element at one end of said valve plate for selectively controlling fluid flow through said first plurality of flow passages, a second plurality of flow passages extending through said valve plate, and a second valve element at the opposite end of said valve plate from said first element for controlling fluid flow through said second plurality of flow passages.

* * * * *

UNITED STATES PATENT OFFICE
CERTIFICATE OF CORRECTION

Patent No. 3,817,566             Dated June 18, 1974

Inventor(s) Johan H. Keijzer, Willy R. J. Pierle and G. Van de Voorde

It is certified that error appears in the above-identified patent and that said Letters Patent are hereby corrected as shown below:

On the Abstract page, the inventor "G. Van de Voordf" should be --G. Van de Voorde--. Column 5, line 41, "th" should be --the--; line 45, "f" should be --of--. Column 6, line 23, after "has a" delete "the" and insert --nut--; line 27, after "extending" delete "of" and insert --valve--. Column 9, line 63, after "member" delete --to said second compartment--.

Signed and sealed this 29th day of October 1974.

(SEAL)
Attest:

McCOY M. GIBSON JR.              C. MARSHALL DANN
Attesting Officer                Commissioner of Patents